United States Patent
Chan et al.

(10) Patent No.: US 11,556,319 B2
(45) Date of Patent: Jan. 17, 2023

(54) SYSTEMS AND METHODS FOR EXTENDING A LIVE RANGE OF A VIRTUAL SCALAR REGISTER

(71) Applicants: Abraham Davidson Fai Chung Chan, Markham (CA); Tyler Bryce Nowicki, Mississauga (CA); Guansong Zhang, Markham (CA); Ahmed Mohammed ElShafiey Mohammed Eltantawy, Markham (CA)

(72) Inventors: Abraham Davidson Fai Chung Chan, Markham (CA); Tyler Bryce Nowicki, Mississauga (CA); Guansong Zhang, Markham (CA); Ahmed Mohammed ElShafiey Mohammed Eltantawy, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 17/009,441

(22) Filed: Sep. 1, 2020

(65) Prior Publication Data

US 2022/0066783 A1    Mar. 3, 2022

(51) Int. Cl.
  *G06F 8/41* (2018.01)
  *G06F 8/20* (2018.01)
  *G06F 9/50* (2006.01)
  *G06F 9/38* (2018.01)

(52) U.S. Cl.
  CPC .............. *G06F 8/441* (2013.01); *G06F 8/20* (2013.01); *G06F 9/5027* (2013.01); *G06F 9/3887* (2013.01)

(58) Field of Classification Search
  CPC .................................. G06F 8/441; G06F 8/20
  USPC .................................................. 717/124–167
  See application file for complete search history.

(56) References Cited

U.S. PATENT DOCUMENTS

| 5,355,494 A | * | 10/1994 | Sistare | .................... | G06F 8/433 |
|---|---|---|---|---|---|
| | | | | | 717/149 |
| 6,408,433 B1 | | 6/2002 | Click, Jr. et al. | | |
| 6,651,247 B1 | | 11/2003 | Srinivasan | | |
| 7,155,704 B2 | * | 12/2006 | Williams | ............ | G06F 11/0724 |
| | | | | | 714/E11.069 |
| 7,721,275 B2 | * | 5/2010 | Kestner | ............... | G06F 9/45516 |
| | | | | | 717/157 |

(Continued)

OTHER PUBLICATIONS

Adve, Vikram, et al. "LLVA: A low-level virtual instruction set architecture." Proceedings. 36th Annual IEEE/ACM International Symposium on Microarchitecture, 2003. MICRO-36.. IEEE, 2003. pp. 205-216 (Year: 2003).*

(Continued)

*Primary Examiner* — Satish Rampuria (57) ABSTRACT

Systems and methods are described for extending a live range for a virtual scalar register during compiling of a program, comprising: receiving an intermediate representation (IR) of a source code configured for implementing single-instruction-multiple-thread (SIMT) execution, the IR representing the source code as control flow graph including a plurality of basic blocks (BB); and when a virtual scalar register defined in a first BB of the IR is last used in a second BB of the IR that is a divergent BB, modifying the IR to extend the live range of the virtual scalar register.

20 Claims, 9 Drawing Sheets

FIG. 4

(56) References Cited

U.S. PATENT DOCUMENTS

| | | | | |
|---|---|---|---|---|
| 8,108,846 | B2* | 1/2012 | Gschwind | G06F 9/3013 |
| | | | | 717/149 |
| 2005/0086650 | A1* | 4/2005 | Yates, Jr. | G06F 9/45533 |
| | | | | 712/229 |
| 2006/0225061 | A1* | 10/2006 | Ludwig | G06F 8/441 |
| | | | | 717/161 |
| 2013/0111453 | A1* | 5/2013 | Kalogeropulos | G06F 8/4452 |
| | | | | 717/161 |
| 2013/0139135 | A1 | 5/2013 | Ditu et al. | |
| 2015/0205590 | A1* | 7/2015 | Sabne | G06F 8/456 |
| | | | | 717/149 |

OTHER PUBLICATIONS

Duesterwald, Evelyn, Rajiv Gupta, and Mary Lou Soffa. "Register pipelining: An integrated approach to register allocation for scalar and subscripted variables." International Conference on Compiler Construction. Springer, Berlin, Heidelberg, 1992. pp. 192-206 (Year: 1992).*

Gillies, David M., et al. "Global predicate analysis and its application to register allocation." Proceedings of the 29th Annual IEEE/ACM International Symposium on Microarchitecture. MICRO 29. IEEE, 1996. pp. 114-125 (Year: 1996).*

Newburn, Chris J., et al. "Intel's Array Building Blocks: A retargetable, dynamic compiler and embedded language." International Symposium on Code Generation and Optimization (CGO 2011). IEEE, 2011. pp. 224-235 (Year: 2011).*

Sujeeth, Arvind K., et al. "Delite: A compiler architecture for performance-oriented embedded domain-specific languages." ACM Transactions on Embedded Computing Systems (TECS) 13.4s (2014): pp. 1-25. (Year: 2014).*

Eisl, Josef, et al. "Trace-based register allocation in a jit compiler." Proceedings of the 13th International Conference on Principles and Practices of Programming on the Java Platform: Virtual Machines, Languages, and Tools. 2016. pp. 1-11 (Year: 2016).*

Diogo Sampaio, Rafael Martins de Souza, Sylvain Collange, and Fernando Magno Quintao Pereira. 2014. Divergence analysis. ACM Trans. Program. Lang. Syst. 35, 4, Article 13 Dec. 2013.

Yunsup Lee, Ronny Krashinsky, Vinod Grover, Stephen W. Keckler, and Krste Asanovic. Convergence and scalarization for data-parallel architectures. In International Symposium on Code Generation and Optimization (CGO'13) 2013.

Syed Zohaib Gilani, Nam Sung Kim, and Michael J. Schulte. Power-efficient computing for compute-intensive GPGPU applications. In Proceedings of the 2013 IEEE 19th International Symposium on High Performance Computer Architecture (HPCA) Sep. 2012.

Feng Yue, Jianmin Pang, Jiuzhen Jin, Dai Chao, "Convergence and Scalarization in Whole Function Vectorization", Dependable Autonomic and Secure Computing (DASC) 2013 IEEE 11th International Conference 2013.

Charu Kalra. Design and Evaluation of Register Allocation on GPUs. Master's thesis. Northeastern University. 2015.

Dani Voitsechov, Arslan Zulfiqar, Mark Stephenson, Mark Gebhart, and Stephen W. Keckler. 2018. Software-Directed Techniques for Improved GPU Register File Utilization. ACM Trans. Archit. Code Optim. 15, 3, Article 38 Oct. 2018.

Ayse Yilmazer, Zhongliang Chen, David Kaeli, "Scalar Waving: Improving the Efficiency of SIMD Execution on GPUs", Parallel and Distributed Processing Symposium 2014 IEEE 28th International 2014.

Kai Wang, Calvin Lin, "Decoupled Affine Computation for SIMT GPUs", ACM SIGARCH Computer Architecture News, vol. 45 2017.

Wei-Yu Chen, Guel-Yan Lueh, Pratik Ashar, Kaiyu chen, Buqi Cheng, "Register Allocation for Intel Processor Graphics", CGO 2018: Proceedings of the 2018 International Symposium on Code Generation and Optimization, Feb. 2018, pp. 352-364.

* cited by examiner

SYSTEMS AND METHODS FOR EXTENDING A LIVE RANGE OF A VIRTUAL SCALAR REGISTER

TECHNICAL FIELD

The present application relates to extending a live range for a virtual scalar register, and in particular to systems and methods for extending a live range for a long-lived virtual scalar register in the context of single-instruction-multiple-thread (SIMT) processing.

BACKGROUND

A central processing unit (CPU) typically includes a few large and complex cores that are designed for fast serial execution. On the contrary, a graphics processing unit (GPU) has thousands of smaller and efficient cores for massive data-parallel applications.

GPUs provide a large number of parallel processors that offer a large pool of execution units, high bandwidth memories and thousands of hardware threads.

SIMT is an execution model used in parallel computing where single instruction, multiple data (SIMD) is combined with multithreading. All instructions in all threads are run in lock-step. Thus, each thread executes the same instruction at the same time, but possibly on different data. A processing unit such as a GPU can implement an SIMT execution model to achieve high performance.

The process of compiling source code typically includes a front end intermediate representation (IR) process that translates the source code of a program into a machine independent intermediate code, and a back end process that uses this IR to generate a machine specific executable code. The process of generating the IR includes defining virtual registers (also known as symbolic registers) to hold values that corresponds to variables included in the source code. Once the IR is generated, the compiler process of register allocation (RA) is performed to allocate the virtual registers (which are not limited in number) to a limited number of physical registers that correspond to a specific processing unit architecture. RA is performed based on the live ranges of virtual registers, which is the range of instructions between a variable's definition and its kill (last use). Once the live ranges are computed, RA typically deploys an algorithm based on graph coloring or linear scan to maximize the number of live ranges assignable to physical registers. In most general purpose compilers, RA assumes a non-SIMT execution pattern, and is unaware of the peculiarities of SIMT thread divergence that results from SIMT thread masking techniques. Conventional RA assumes that only one of the divergent basic blocks will execute at a time. This assumption enables RA to assign the same physical register to different virtual registers in either of the divergent branches. The assumption is valid for vector registers, but it is incorrect for virtual scalar registers whose definition and kills are in different basic blocks (referred to herein as long-lived scalar registers).

Accordingly, existing RA processes are not optimized for SIMT execution model. Thus, a compiling solution that enables better support for the SIMT execution model is desired.

SUMMARY

The present disclosure provides systems, methods for extending a live range of a virtual scalar register. If it is determined that a basic block (BB) where the virtual scalar register is last used or killed is a divergent BB, the live range of the virtual scalar register is extended. In some embodiments, if a BB where the virtual scalar register is defined is determined to be a convergent BB, use of the virtual scalar register will be extended, which may in turn help to extend the live range of the virtual scalar register. In some embodiments, if it is determined that a BB where the virtual scalar register is defined is a divergent BB, both use and definition of the virtual scalar register are extended. The extended live range of the virtual scalar register enables the live range to have some overlap with live ranges of other virtual scalar registers, which may help to present the virtual scalar register used for one conditional branch from being overwritten or reassigned while the virtual scalar register is used by the other conditional branch under a thread divergent control flow. Thus, system performance and accuracy of compilation may be boosted.

According to a first aspect, a computer-implemented method is disclosed. The method, performed during compiling of a program, includes receiving an intermediate representation (IR) of a source code configured for implementing single-instruction-multiple-thread (SIMT) execution, the IR representing the source code as control flow graph including a plurality of basic blocks (BB). When a virtual scalar register defined in a first BB of the IR is last used in a second BB of the IR that is a divergent BB, modifying the IR to extend the live range of the virtual scalar register.

In some examples of the first aspect, the method includes modifying the IR to extend the live range of the virtual scalar register comprises: identifying, in the IR, a third BB that is convergent and strictly post-dominates the second BB, but does not strictly post-dominate any other BB that strictly post-dominates the second BB; and inserting a dummy use statement for the virtual scalar register into the third BB.

In some examples of the first aspect, the method includes modifying the IR to extend the live range of the virtual scalar register comprises: identifying, in the IR, a third BB that strictly post-dominates the second BB, but does not strictly post-dominate any other BB that strictly post-dominates the second BB; and inserting a dummy use statement for the virtual scalar register into the third BB.

In some examples of one or more of the preceding example aspects, modifying the IR to extend the live range of the virtual scalar register further comprises, when the first BB is a divergent BB: identifying, in the IR, a fourth BB that is convergent and strictly dominates the first BB, but does not strictly dominate any other BB that strictly dominates the first BB; and inserting a dummy definition statement for the virtual scalar register into the fourth BB.

In some examples of one or more of the preceding example aspects, after extending the live range of the virtual scalar register, a physical register is allocated based on the extended live range of the virtual scalar register.

In some examples of one or more of the preceding example aspects after allocating the physical register, any dummy use statement and dummy definition statement are removed.

In some examples of one or more of the preceding example aspects, a machine executable binary code representation of the IR is generated after removing any dummy use statement and dummy definition statement.

In some examples of one or more of the preceding example aspects, the machine executable binary code is configured to be run by a processing unit that implements single-instruction-multiple-thread (SIMT) processing.

According to a second example aspect is a system comprising a processing device, and a non-transitory storage storing instructions that configure the processing device to perform the method of one or more of preceding example aspects.

According to a third example aspect is a computer-readable storage medium storing machine-executable instructions that when executed by a processing device cause the processing device to perform the method of one or more of preceding example aspects.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure provides systems and methods for extending a live range of a long-lived virtual scalar register that is defined for a variable during the compiling process, prior to physical register allocation, in order to prevent the virtual scalar register from being reassigned among different conditional branches under a thread divergent control flow. In at least some applications, the disclosed systems and methods may help to improve compiling accuracy.

Figure 1A:
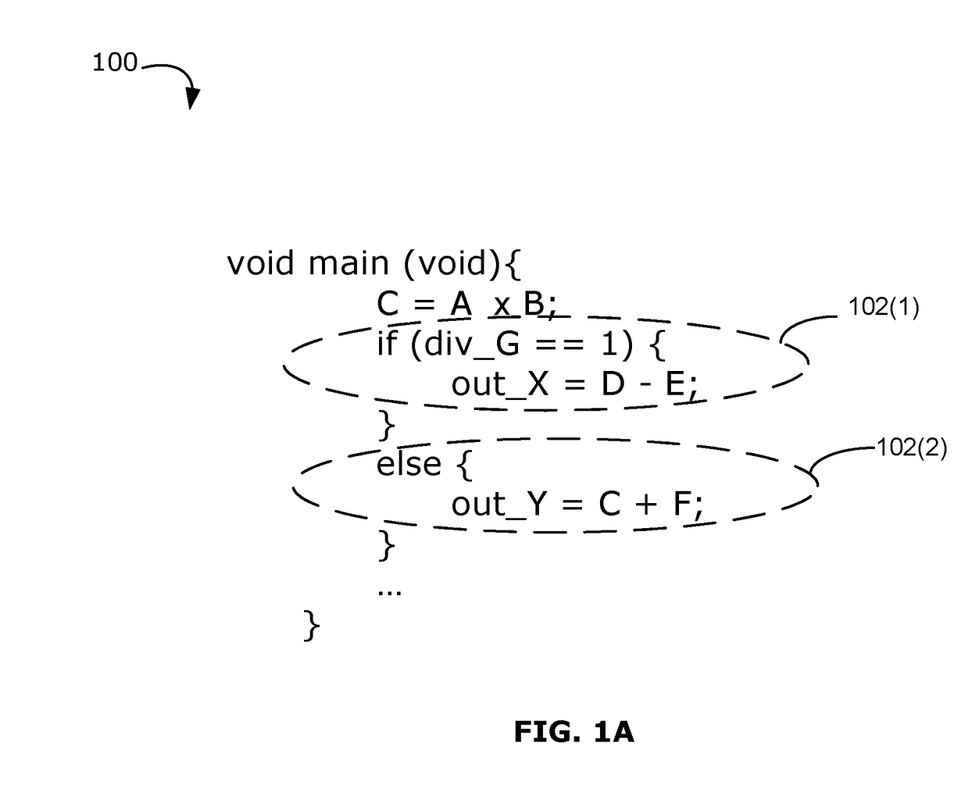
FIG. 1A illustrates an example of source code that includes conditional branches.
Figure 1B:
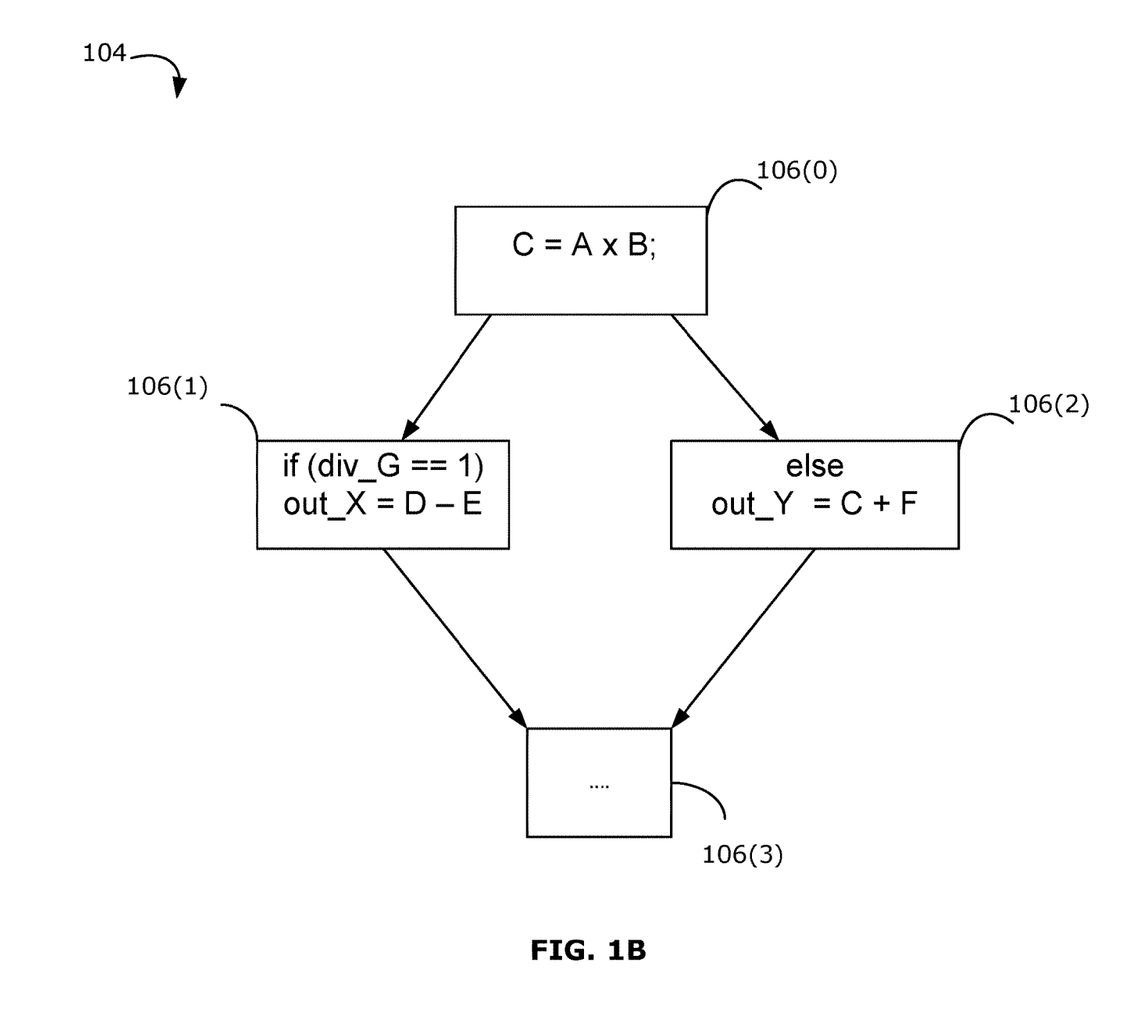
FIG. 1B illustrates a control flow graph (CFG) representing the source code of FIG. 1A.

By way of context, FIG. 1A shows an illustrative example of source code 100 written in a programming language, such as C language. The source code 100 defines a graphics shader function written in a high level language, and includes conditional branches 102(1)-102(2), which cause thread divergence in a control flow. As shown in FIG. 1A, the conditional branches 102(1)-(2) include "if" and "else" conditional branches, which are called if-else branch divergences. FIG. 1B presents a control flow graph (CFG) 104 intermediate representation (IR) of the source code 100. A CFG is a graph whose nodes are basic blocks (BBs) and whose edges are transitions between the blocks.

The CFG 104 includes a plurality of basic blocks (BBs) 106(0)-106(3). The BBs 106(1)-106(2) are divergent BBs as each corresponds to a respective conditional branch 102 of the source code 100. In the example of FIGS. 1A and 1B, during compiling, virtual scalar registers can be defined or created to hold respective variables during a time that the variables are in use (e.g., the live range of variable and its respective virtual scalar register). As noted above, during compiling, a RA process assigns respective physical registers for the virtual scalar registers based on the live ranges of the virtual scalar registers. However, as the number of physical registers is limited, the conventional RA process does not perform register assignment in a SIMT friendly manner. For example, with respect to the divergent BBs 106(1)-106(2), the complier assumes that only one of the divergent BBs will execute at a time. Therefore, the RA process may assign an identical physical register to variables that are associated with the two conditional branches. However, this kind of assignment may introduce errors during compilation, in particular, for long-lived scalar registers whose definition and last use (also known as kill) are populated in different BBs.

Figure 2:
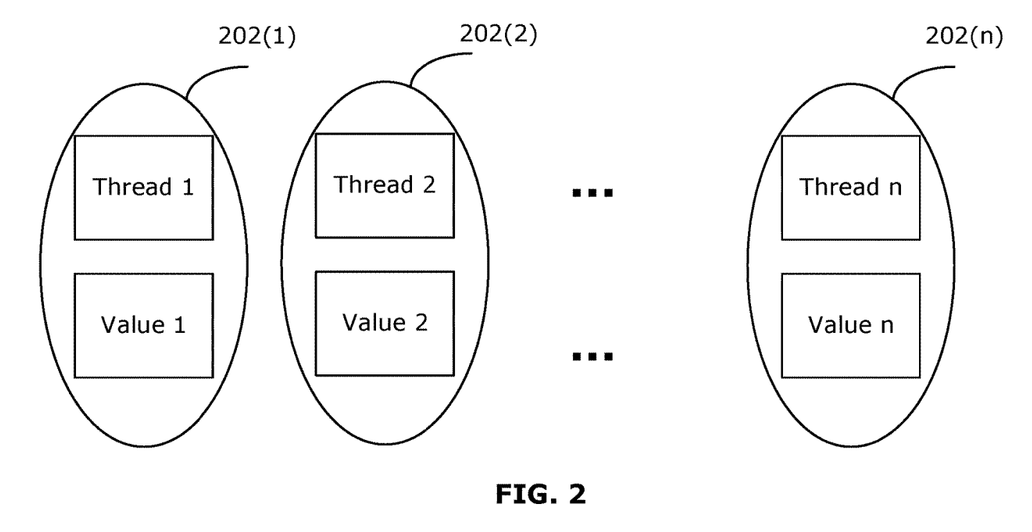
FIG. 2 illustrates a schematic diagram of virtual vector registers.
Figure 3:
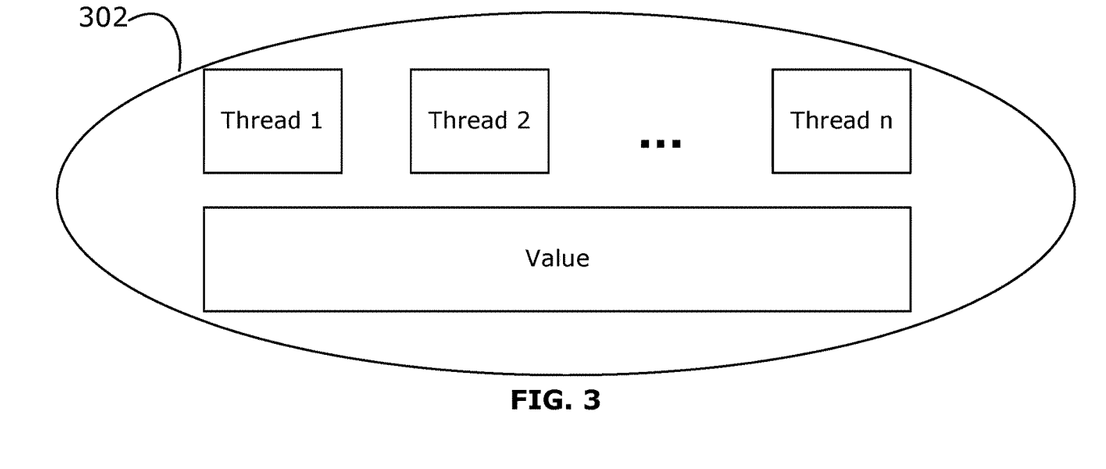
FIG. 3 illustrates a schematic diagram of virtual scalar registers.

To provide further context, reference is now made to FIGS. 2 and 3, which show two types of virtual registers. A processing unit such as a GPU can support two classes of registers: scalar general purpose registers (SGPRs), and vector general purpose registers (VGPRs). During the pre-RA compiling process, SGPRs are represented by virtual scalar registers and VGPRs are represented by virtual vector registers. FIG. 2 demonstrates a schematic diagram including a plurality of vector registers 202(1)-202($n$), each of which holds or carries a respective variable value for each thread. In contrast, FIG. 3 illustrates a scalar register 302, which holds a uniform value for a variable (e.g., identical value) across a plurality of threads of a single work group. In the SIMT model, the plurality of threads in the single work group are executed in lockstep. If values held by the vector registers 202 are uniform or identical, the vector register 202 can be converted during compiling into a scalar register 302 to save computational resources. As the scalar register 302 holds a uniform value for every single thread, using a scalar register in place of a vector register may help to reduce register pressure, increase parallelism at the warp level (e.g., a warp includes a group of threads), and reduce energy consumption. Thus, if physical register allocation in respect of scalar registers can be performed in a more SIMT friendly manner during the compiling process, further advantage can be taken of opportunities to use scalar registers in place of vector registers.

Referring to FIG. 1B again, the CFG 104 includes a root BB 106(0), an "if" BB 106(1), and an "else" BB 106(2). As part of the compiling process, virtual scalar registers are defined for each variables in the CFG 1-4. The virtual scalar register for a variable has a live range that corresponds to a live range of that variable. The live range of a variable (and its respective virtual scalar register) refers to the span of basic blocks (or instructions) from a definition of that variable (and its a virtual scalar register) for that variable to the last use last use of the variable (and its virtual scalar register. The term "kill" is used in this disclosure interchangeably with "last use". In the example illustrated in FIG. 1B, variable C is first defined in root BB 106(0), and last used in conditional BB 106(2), and thus variable C and its respective virtual scalar register have a live range of {106(0), 106(2)}. By way of further examples, the variable X is both defined and last used in the "if" BB 106(1). Thus, variable X and its respective virtual scalar register have a live range of {106(1)}. Because the number of physical registers are limited, during the IR generation process a compiler will try to optimize the use of virtual registers so as to ultimately optimize the allocation of physical registers. Accordingly, it is possible that in the case of variables with disjoint live ranges, a virtual scalar register that is used for one variable in one conditional branch may be reassigned to a different variable in a different conditional branch. For example, the variables C and X may be assigned to an identical virtual scalar register, for example, represented by vvw2. In that case, the virtual scalar register vvw2 will be overwritten or reassigned in the "if" BB 106(1) before the virtual scalar register vvw2 will be used in "else" BB 106(2).

The present disclosure provides a solution to extend a live range of a variable and its respective virtual scalar register during a compiling process, prior to RA, which may help to prevent the virtual scalar register from being overwritten in different conditional branches before the virtual scalar register is used. Thus, accuracy of using virtual scalar registers may be improved significantly, which may in turn enable scalar registers to be used in the place of vector registers, and thereby help to reduce register pressure and/or reduce power consumption when using CPUs or GPUs to run SIMT processing models.

Figure 4:
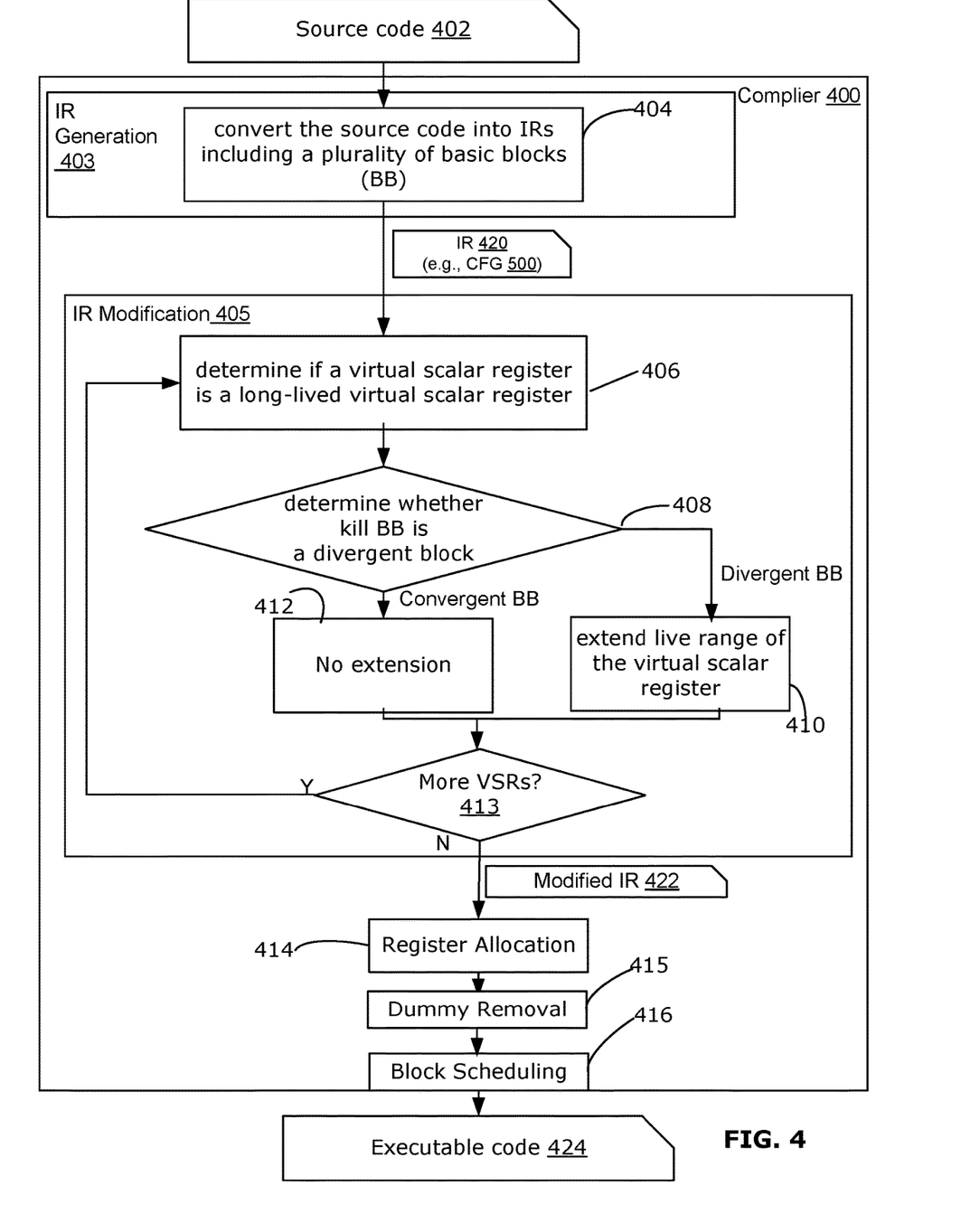
FIG. 4 illustrates a compiler according to example embodiments, the compiler including an intermediate representation (IR) modification module extending a live range of virtual scalar registers.

FIG. 4 illustrates a logical block diagram of processes implemented by a compiler 400 for compiling source code 402 according to example embodiments. In example embodiments, source code 402 includes instructions for implementing a function that is designed to operate using an SIMT execution model. The compiler 400 performs conventional compiler operations or processes such as an IR generation process 403, register allocation (RA) process 414 and other compiler processes such as basic block scheduling 416, that are used to convert source code 402 into an executable code 424. However, as will be explained in greater detail below, according to example embodiments, the compiler 400 also includes an intermediate representation (IR) modification process for selectively extending the live ranges of the virtual scalar registers that are defined for respective variables in the IR generated by IR generation process 403. As will be described below, IR modification process 405 is configured to selectively insert dummy variable definitions and uses into BBs of the IR to extend live ranges. A dummy removal process 415 is included after RA process 414 to remove the dummy variable definitions and uses from the code. In at least some applications, the presence of IR modification process 405 enables the compiler 400 to produce executable code 424 that is better structured to take advantage of the SIMT execution model than it would be in the absence of IR modification process 405.

The operation of compiler 400 will now be explained in greater detail. The source code 402 that is received and processed by compiler 400 comprises a set of instructions for implementing a function that is to run using an SIMT architecture. Although a shader function is mentioned above, source code 402 could include instructions for any of a number of different possible types of functions that are designed to run using an SIMT architecture. The instructions include a plurality of variables and conditional branches. In example embodiments, IR generation operation 403 is configured to apply known compiling methods to convert source code 402 into an intermediate representation (IR) 420 that includes a plurality of basic blocks (BB), as indicated at 404. IR generation process 403 could for example be configured to generate a machine-independent LLVR IR that is compiled down to a Machine IR that serves as a portable, high-level assembly language. The IR generation process 403 may include lexical analysis, parsing, and semantic analysis of the received source code 100 and translate the received source code into a respective IR. In this regard, in example embodiments IR generation process 403 uses known methods to represent the source code 402 as an abstract syntax tree, then represent the abstract syntax tree as an IR 420. In example embodiments, the IR 420 is a Machine IR.

Figure 5A:
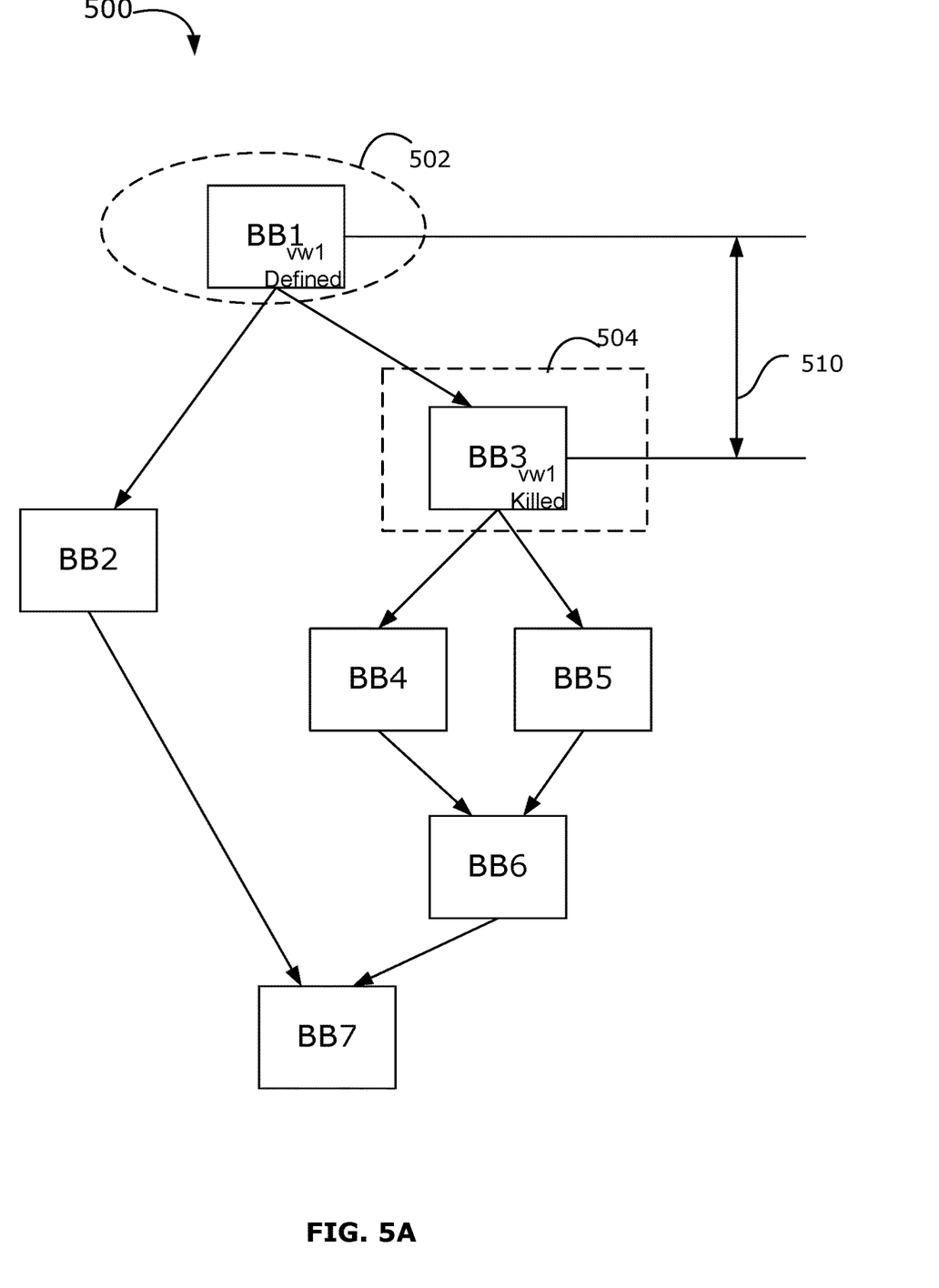
FIG. 5A shows a CFG including a plurality of basic blocks (BBs) illustrating the live range of a virtual scalar register.

FIG. 5A provides an illustrative example of a control flow graph (CFG) 500 representation of IR 420 generated by IR generation process 403. CFG 500 is a hybrid IR representation of source code 402 in that basic blocks (BBs) are used to represent simple, linear, sequences of instructions from the source code 402, and a graph topography of transition edges between BBs that represent a control flow among the BBs. The CFG 500, as illustrated, includes a plurality of BBs, such as BB1-BB7. Each BB encodes an instruction or a sequence of instructions without any control flow (e.g., each BB encodes straight line or branch-free code). Each BB forms a respective node of CFG 500, with control flows being modeled by a direct graph, represented by the edges in FIG. 5A. The CFG 500 of FIG. 5A is referenced for illustrative purposes in the present disclosure, but is just one example of a possible IR structure.

CFG 500 includes a plurality of virtual scalar registers that are defined for each of the respective source code variables during the IR generation process 403. The virtual scalar registers can each be "short-lived" or "long-lived". Short-lived virtual scalar registers are registers that are both defined and last used (i.e., killed) within the instructions included in single BB. Long-lived virtual scalar registers are registers that are defined in one BB and then subsequently last used or killed in a further BB. By way of example, in CFG 500 an illustrative virtual scalar register vw1 is first defined in BB1 and then killed in a different BB, namely BB3. Thus, virtual scalar register vw1 is a long-lived virtual scalar register. The live range of the virtual scalar register vw1 is {BB1, BB3}, which is denoted by a line 510. For illustrative purposes, throughout the FIGs, a dashed oval (e.g., oval 502) is used to indicate a BB in which a subject virtual scalar register (vwi in the case of FIG. 5A) in the IR 420 (e.g., CFG 500) is defined by IR generation process 403, and a dashed rectangle (e.g., rectangle 504) is used to indicate the BB in which the subject virtual scalar register is then killed in the IR 420 (e.g., CFG 500) is defined by IR generation process 403.

IR modification process 405 is configured to perform multiple passes of IR 420 (e.g., CFG 500) to identify and, if required, extend the long lived virtual scalar registers defined in the IR 420. In this regard, as indicated at 406, IR modification is configured to determine if a virtual scalar register (for example virtual scalar register vwi) is a long-lived virtual scalar register or a short-lived virtual scalar register. If the virtual scalar register vwi is short-lived, no further action needs to be taken in respect of that virtual scalar register. However, the virtual scalar register vwi is long-lived, further consideration is required to determine of the virtual scalar register vwi is to be extended.

In particular, as indicated at 408, a determination is made regarding whether the BB where the long-lived virtual scalar register vwi is last used (e.g., killed) is a convergent BB (also known as a BB in convergence) or a divergent BB (also known as a BB in divergence). A BB is a divergent BB if it follows a BB with a non-uniform terminator instruction but precedes a Phi BB. Thus, a divergent BB is included in only one or only a subset of threads included in a group of parallel threads. For example, BB2, BB3, BB4, BB5 and BB6 of FIG. 5A are each divergent BBs. The divergent BBs are the BBs residing within a CFG, excluding the entry BB and the exit BB for the CFG. A BB is convergent if all other BBs within the thread work group converge to that BB, for example the entry BB (e.g., BB1 in CFG 500) or the exit BB (e.g., BB7 in CFG 500).

If it is determined at 408 that the BB where the virtual scalar register vwi is killed is a convergent BB (e.g., BB1 or BB7 in CFG 500), then no modification of the IR is required in respect of that virtual scalar register, as indicated at 412.

However, if it is determined at 408 that the BB where the virtual scalar register vwi is killed is a divergent BB (e.g., any of BB2 to BB6 in CFG 500), the IR modification process 405 is configured to perform a sub-process 410 to modify the IR to extend a live range of the virtual scalar register vwi, as indicated at 410.

Figure 5B:
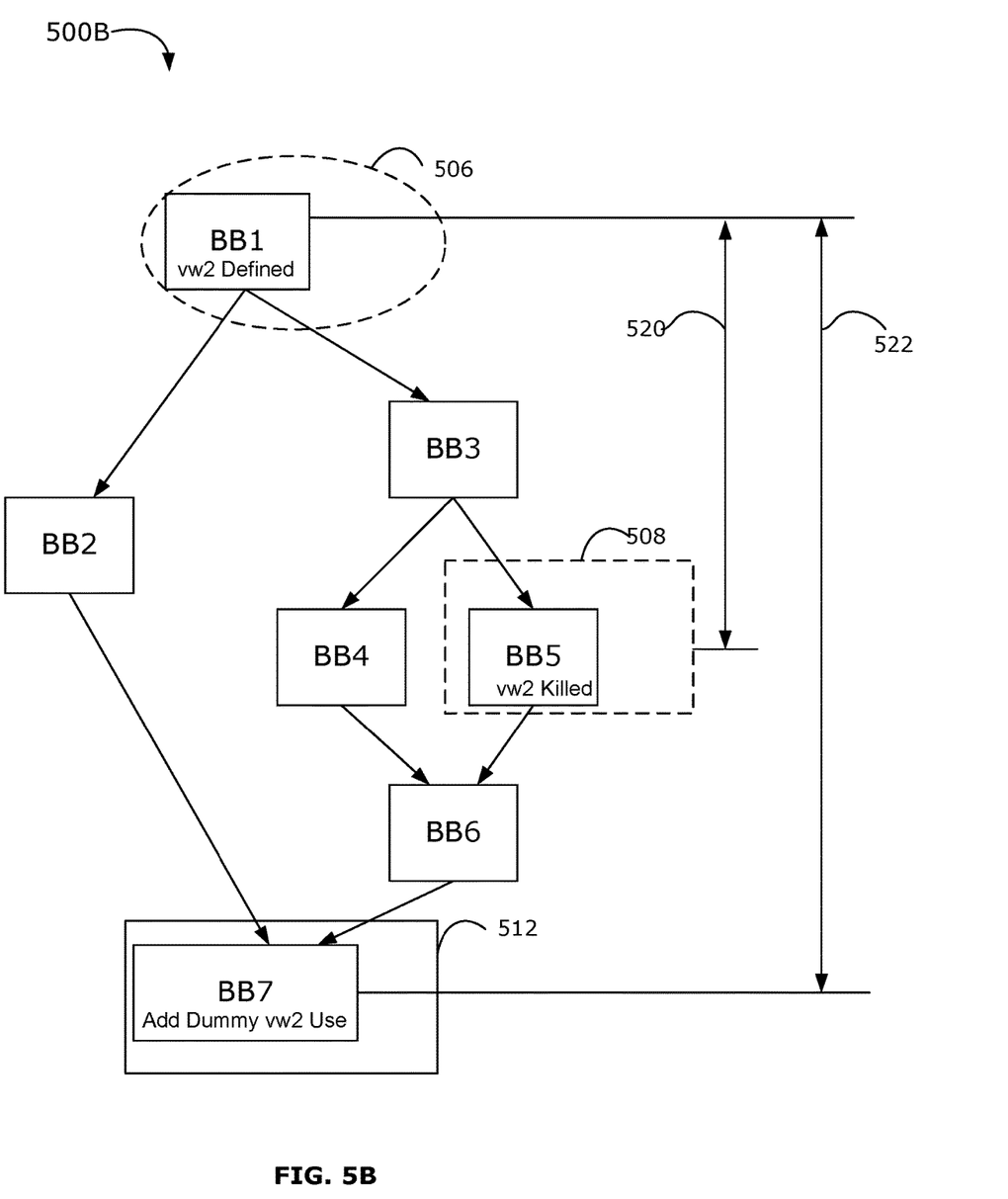
FIG. 5B shows an example of extending the live range of the virtual scalar register.
Figure 5C:
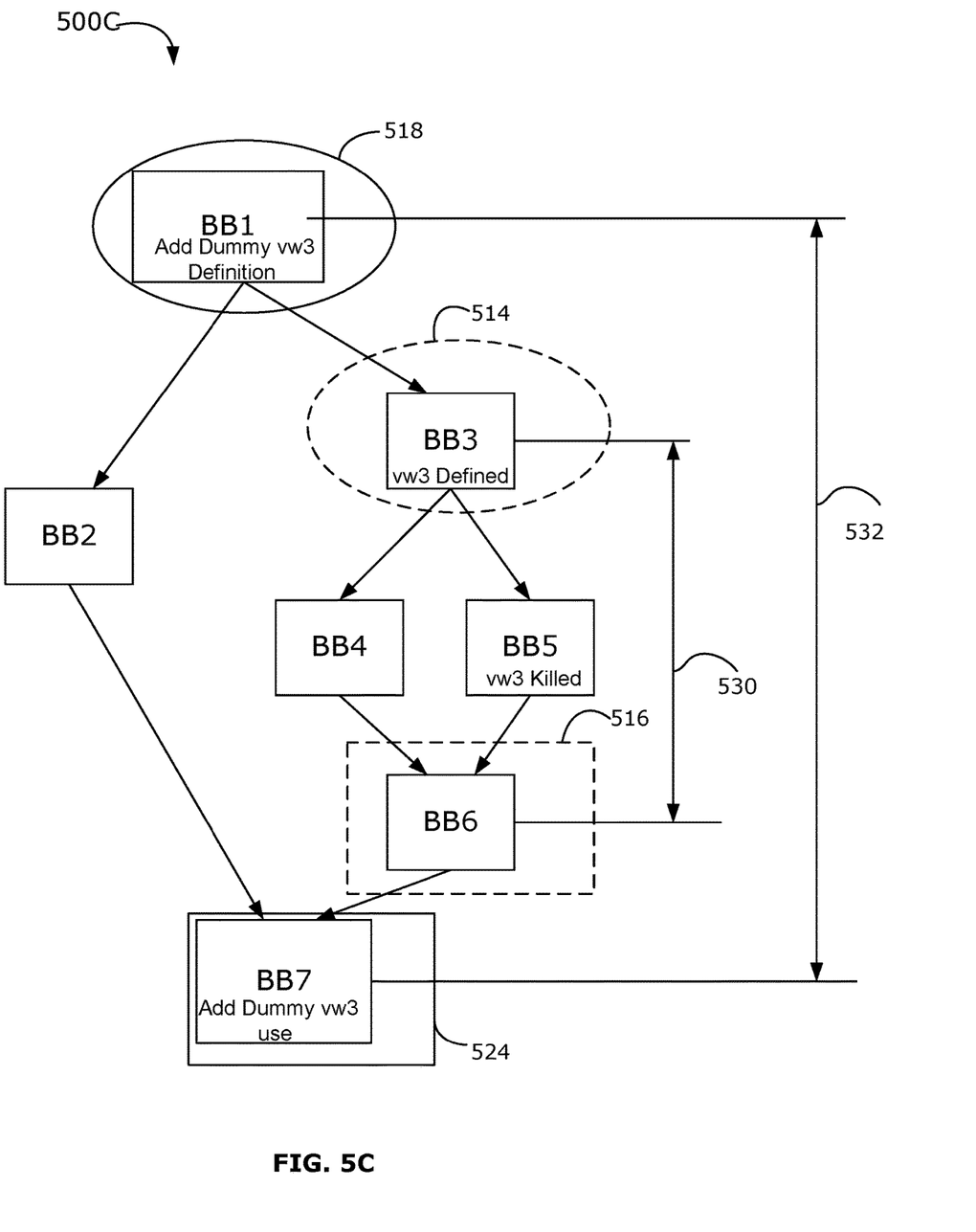
FIG. 5C shows an alternative example of extending the live range of the virtual scalar register.
Figure 6:
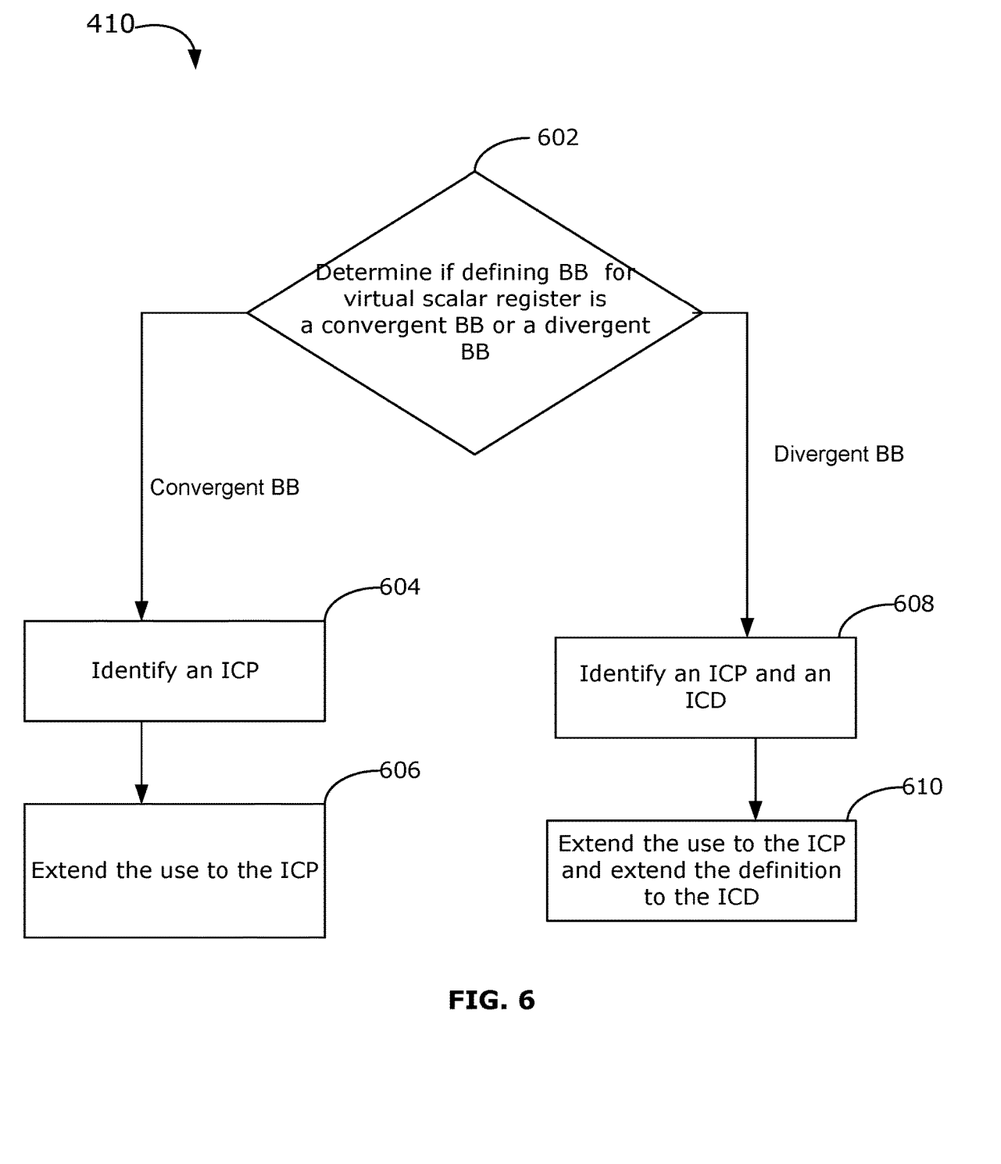
FIG. 6 illustrates a flowchart of actions performed by the MIR modification process of FIG. 4 for extending the live range of the virtual scalar register.

Examples of sub-process 410 to extend a live range of a virtual scalar register vwi will be now described in different scenarios with reference to the illustrative CFGs 500B and 500C illustrated in FIGS. 5B and 5C, and the details of sub-process 410 as shown in FIG. 6.

FIG. 5B presents an example of extending the live-range of a virtual scalar register (e.g., virtual scalar register vw2) by adding a dummy use of the virtual scalar register to a further BB in the CFG 500B. In the example of FIG. 5B, in IR 420, the virtual scalar register vw2 is defined in the BB1 (denoted by a dashed circle 506), and the virtual scalar register vw2 is last used in BB5 (denoted by a dashed rectangle 508). The live range of the virtual scalar register vw2 in IR 420 is {BB1, BB5}, as denoted by a line 520.

In the example of FIG. 5B, BB5 (i.e., the kill BB for virtual scalar register vw2) will be classified as a divergent BB at 408 in FIG. 4, and accordingly, sub-process 410 will be performed to extend the live range of the virtual scalar register vw2. Referring to FIG. 6, sub-process 410 commences with a determination (step 602) as to whether the BB in which the subject virtual scalar register is defined is a divergent BB or a convergent BB.

In the case where the defining BB is a convergent BB, such as in the example illustrated in FIG. 5B (BB1, where the virtual scalar register vw2 is defined, is a convergent BB), the live range of the virtual scalar register is extended by adding a dummy use of the virtual scalar register to a further BB in the CFG 500B as indicated in steps 604 and 605 of sub-process 410. In particular, as indicated at step 604, an immediate convergent post-dominator (ICPD) BB is identified for the BB in which the subject virtual scalar register was killed. Accordingly, in the example of FIG. 5B, an ICPD BB is determined in respect of BB5 (the kill BB for virtual scalar register vw2).

In this disclosure, a node or BB "CP" is an ICPD of a BB "N" if the BB "CP" is a convergent BB and strictly post-dominates the BB "N", but does not strictly post-dominates any other BB that strictly post-dominates the BB "N". Every divergent BB has an ICPD. The exit BB (e.g., BB7), the entry BB (e.g., BB1), and any other convergent BBs cannot have an ICPD. The qualifier "strictly" means that the BB "CP" is different than (i.e., is not) the BB "N". In the example of FIG. 5B, BB7 (denoted by a solid rectangle 512) is a convergent block, which is the ICPD BB of BB5.

As indicated in step 606, the virtual scalar register live range is extended to the ICPD. In example embodiments this is done by modifying IR 420 by inserting a dummy use statement for the virtual scalar register in the identified ICPD BB, resulting in modified IR 422. In the example of FIG. 5B, a dummy use statement for virtual scalar register vw2 is added to the instructions included in BB7. Thus, the live range of the virtual scalar register vw2 is then extended from {BB1, BB5}, as denoted by the line 520, to {BB1, BB7}, which is denoted by a line 522. Such a method of extending the live range of the virtual scalar register ensures a live range of the virtual scalar register (e.g., vw2) for holding a uniform variable to have overlap with live ranges of other virtual scalar registers, which may help to prevent the virtual scalar register from being overwritten or being reassigned on other conditional branches before the virtual scalar register is used.

Referring again to Step 602 of FIG. 6, CFP 500C of FIG. 5C will now be used to illustrate an example of extending the live range of a virtual scalar register in the case where the defining BB for a long-lived virtual scalar register is a divergent BB. In this regard, FIG. 5C shows an example of extending a live range of a virtual scalar register vw3, in accordance with example embodiments. As shown in FIG. 5C, the virtual scalar register vw3 is defined in BB3 (denoted by a dashed circle 514), and the virtual scalar register vw3 is last used and thus killed in BB6 (denoted by a dashed rectangular 516). The live range of the virtual scalar register vw3 in IR 420 is {BB3, BB6}, as denoted by a line 530.

As can be seen in FIG. 5C, the BB (i.e., BB3) that defines virtual scalar register vw3 is a divergent BB. Accordingly, steps 608 and 610 of sub-process 410 are performed to extend the live-range of virtual scalar register vw3. As indicated at step 608, if a BB where the long-lived virtual scalar register is defined is a divergent block, not only is an ICPD BB of the BB where the virtual scalar register is last used or killed (e.g., BB6 in CFG 500C) identified, but an immediate convergent dominator (ICD) BB for the BB where the virtual scalar register is defined (e.g., BB3 in CFG 500C) is also identified. The identified ICPD BB and the ICD BB are used to extend the live range of the virtual scalar register (step 610).

In this disclosure, a node or BB "CD" is an ICD of a BB "N" if the BB "CD" is a convergent BB and strictly dominates the BB "N", but does not strictly dominate any other BB that strictly dominates the BB "N". Every divergent BB has an ICD. The entry BB, exit BB, and other convergent BB in a CFG cannot have an ICD BB. As illustrated in FIG. 5C, BB1 is convergent block, which acts as an ICD BB of the BB3 where the virtual scalar register vw3 is defined, and BB7 is also a convergent block, acting as a ICPD BB of the BB6 where the virtual scalar register vw3 is used or killed.

In order to enable an extended live range of the virtual scalar register vw3 to have some overlap with live ranges of other virtual scalar registers within the thread work group, as indicated in step 610, the live range of the virtual scalar register vw3 is extended in two directions, namely to the ICPD of BB6, which is BB7 (denoted by a solid rectangle), and to the IDC of BB3, which is BB1 (denoted by a solid rectangular 518). In some examples, the live-range is extended by modifying IR 420 by inserting a dummy use statement in the instructions include in the identified ICPD BB (e.g., BB7, denoted by solid oval 524 in FIG. 5C) and inserting a dummy definition statement in the instructions of the identified ICD BB (e.g., BB1, denoted by solid rectangle 518 of FIG. 5C), resulting in modified IR 422.

Thus, the live range of the virtual scalar register vw3 is then extended from {BB3, BB6} denoted by the line 530 to {BB1, BB7}, which is denoted by a line 532.

The flowchart of FIG. 6, illustrating sub-process 410 of extending a live range of a virtual scalar register, can be summarized as follows:

At step 602, a determination is made whether the defining BB for a subject virtual scalar register (e.g., vwi) is a divergent BB or a convergent BB. The determination is made based on the definitions of divergent and convergent BB as discussed above.

When the defining BB is a convergent BB, an ICPD BB is determined for the kill BB for the virtual scalar register vwi (step 604), and the live range of the virtual scalar register vwi is extended to the identified ICPD BB (step 606). In some examples, a dummy use statement is inserted in the identified ICPD BB in order to extend the use of the virtual scalar register.

When the defining BB is a divergent BB, both an ICPD BB for the kill BB, and an ICD BB for the defining BB are identified (step 608). The live range of the virtual scalar register vwi is extended to extend from the identified ICD BB to the identified ICPD BB (step 610). In some examples, live range is extended by inserting a dummy use statement is in the identified ICPD BB to extend the last use or kill to the identified ICPD BB, and inserting a dummy definition statement in the identified ICD BB to extend the definition. In some examples, the dummy use statement and the dummy definition statement are not intended to have any function, other than as placeholders in the modified IR 422.

Referring again to FIG. 4, as indicated at 413, the IR modification process 405 can be repeated in respect of all virtual scalar registers in a IR 420. The resulting modified IR 422 can then be subjected to RA process 414 to enable physical registers to be allocated based on the virtual registers included in modified IR 422.

In some examples, after register allocation, the dummy use statement and/or the dummy definition statement will be removed in a clean-up process 415, following which machine specific optimization processes, including basic block scheduling 416, may be performed to generate executable binary code 424 for execution by a GPU using an SIMT execution model.

In example embodiments, post-RA block scheduling 416 is a SIMT specific process where BBs are serialized in a linearized order before execution by a processing unit. For example, all BB's in diamond shaped CFG (e.g., CFG's 104, 500, 500B, 500C described above are examples of diamond shaped CFG's that have convergent entry and exit BB's and intermediate divergent BBs) must be eventually executed in a linear order in the SIMT execution model. Divergent BBs can be serialized in any order as long as they have no dependencies on each other. For example, consider the case of BB2 and BB3. BB2 and BB3 are both divergent (sibling nodes in the CFG 500), but are not dependent on each other. Through static analysis, it may be determined that that the schedule (or execution order), BB2→BB1 is more efficient than BB1→BB2.

Conventional solutions do not take into account post-RA scheduling when generating the IR. In the example above, conventional solutions might assume that BB1→BB2 is always true. This affects the live range calculation of scalar registers. By extending the scalar register all the way to the ICPD and ICD the presently described solution makes no assumptions on the post-RA schedule, and thus may enable optimized post-RA scheduling, especially in the context of SIMT optimised processing unit hardware configurations.

In some scenarios, the disclosed method and system to extend a live range of the virtual scalar register may mitigate against disjoinder of the live ranges of virtual scalar registers before resource allocation is performed, which may help to prevent a virtual scalar register from being overwritten erroneously. In some examples, this may allow an SIMT model to be efficiently implemented on a GPU without requiring changes to the machine specific RA process as the IR modification can be performed in a machine-agnostic manner as part of the front-end compiling process. In at least some example embodiments, extending live ranges by inserting dummy definitions and/uses, avoids a requirement to change the internals of the register allocator within a compiler, and also may eliminate a need to maintain separate register allocators (one for scalar registers, and another for vector registers).

Figure 7:
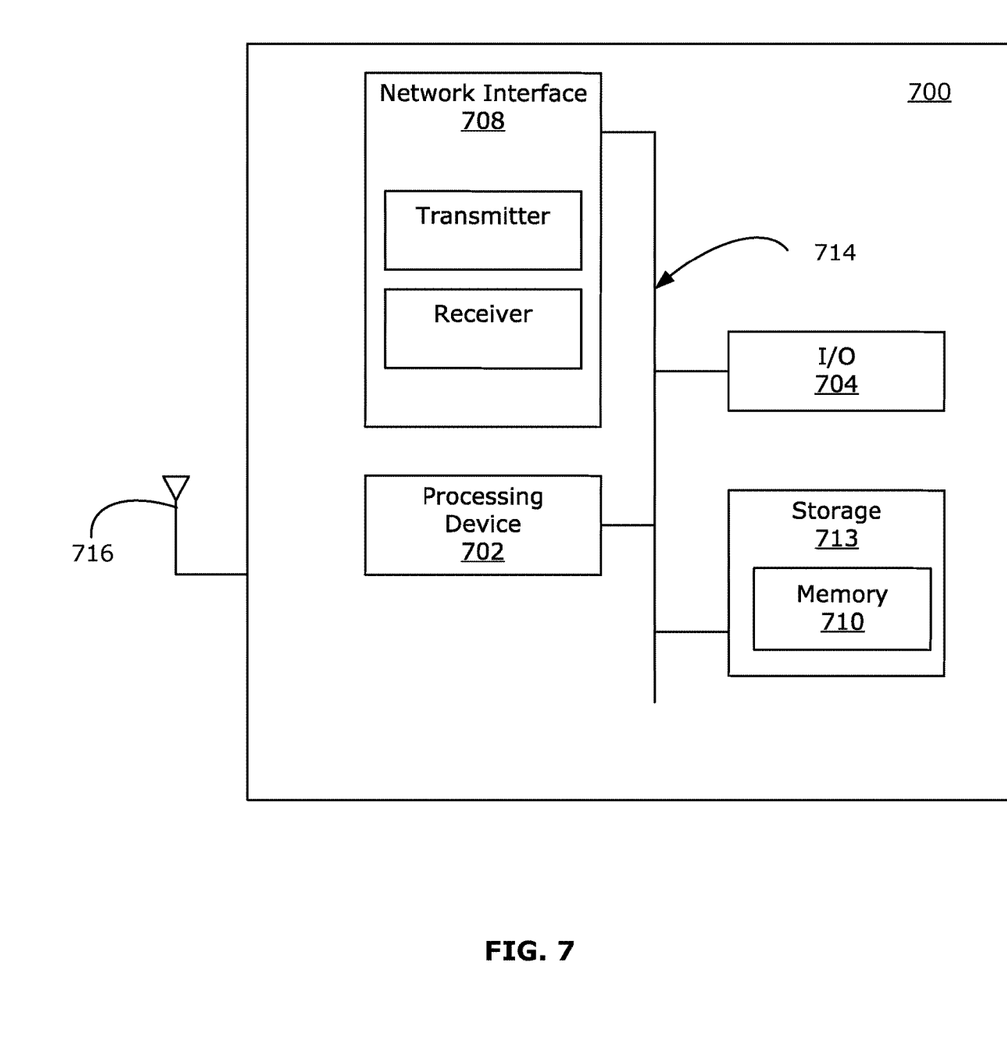
FIG. 7 is a block diagram illustrating a processing system which may be used to implement one or more processes of the compiler of FIG. 4, according to example embodiments.

FIG. 7 illustrates an example processing system 700 which may be used to implement methods and systems described herein, including one or more processes of the compiler 400 such as IR modification process 405. Other processing systems suitable for implementing the methods and systems described in the present disclosure may be used, which may include components different from those discussed below. Although FIG. 7 shows a single instance of each component/function, there may be multiple instances of each component in the processing system 700.

The processing system 700 may include one or more processing devices 702, such as a processor, a microprocessor, a CPU, a GPU, an application-specific integrated circuit (ASIC), a field-programmable gate array (FPGA), a dedicated logic circuitry, or combinations thereof. The processing system 700 may also include one or more input/output (I/O) interfaces 714, which may enable interfacing with one or more appropriate input devices and/or output devices (not shown). One or more of the input devices and/or output devices may be included as a component of the processing system 700 or may be external to the processing system 700. The processing system 700 may include one or more network interfaces 708 for wired or wireless communication with a network. In example embodiments, network interfaces 708 include one or more wireless interfaces such as transmitters that enable communications in a network. The network interface(s) 708 may include interfaces for wired links (e.g., Ethernet cable) and/or wireless links (e.g., one or more radio frequency links) for intra-network and/or inter-network communications. The network interface(s) 708 may provide wireless communication via one or more transmitters or transmitting antennas, one or more receivers or receiving antennas, and various signal processing hardware and software. In this regard, some network interface(s) 708 may include respective processing systems that are similar to processing system 700. In this example, a single antenna 716 is shown, which may serve as both transmitting and receiving antenna. However, in other examples there may be separate antennas for transmitting and receiving.

The processing system 700 may also include one or more storage units 713, which may include one or more memories 710 (e.g., volatile memories (e.g., random access memory (RAM)), and persistent or non-transitory memories (e.g., a flash memory, and/or a read-only memory (ROM))), as well as other persistent storage (e.g., solid state hard drive, magnetic hard drive, and/or optical disc drive). The non-transitory storage may store instructions for execution by the processing device(s) 702, such as to carry out the methods described above in respect of the present disclosure. The storage units 713 may include other software instructions, such as for implementing an operating system and other applications/functions. In some examples, one or more data sets and/or module(s) may be provided by an external memory (e.g., an external drive in wired or wireless communication with the processing system 700) or may be provided by a transitory or non-transitory computer-readable medium. Examples of non-transitory computer readable media include a ROM, an erasable programmable ROM (EPROM), an electrically erasable programmable ROM (EEPROM), a flash memory, a CD-ROM, or other portable memory storage.

There may be a bus 714 providing communication among components of the processing system 700, including the processing device(s) 702, I/O interface(s) 704, network interface(s) 708, storage unit(s) 713, memory(ies) 710. The bus 714 may be any suitable bus architecture including, for example, a memory bus, a peripheral bus or a video bus.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A computer-implemented method performed during compiling of a program, comprising:
    receiving an intermediate representation (IR) of a source code configured to be executed by a processing unit that implements single-instruction-multiple-thread (SIMT) processing, the IR representing the source code as a control flow graph including a plurality of basic blocks (BBs);
    identifying, in the IR, a virtual scalar register for a respective variable, the virtual scalar register is defined in a first BB of the IR and last used in a second BB of the IR, the virtual scalar register holding a uniform value for the respective variable across a plurality of threads of a single work croup, and the virtual scalar register having a live range corresponding to a span of BBs in the IR from the definition of the respective variable to the last use of the respective variable; and
    when the second BB of the IR is a divergent BB, modifying the IR to extend the live range of the virtual scalar register.

2. The method of claim 1 wherein modifying the IR to extend the live range of the virtual scalar register comprises:
    identifying, in the IR, a third BB that (i) is convergent, and (ii) strictly post-dominates the second BB, but does not strictly post-dominate any other BB that strictly post-dominates the second BB; and
    inserting a dummy use statement for the respective variable of the virtual scalar register into the third BB.

3. The method of claim 2, wherein modifying the IR to extend the live range of the virtual scalar register further comprises:
    when the first BB is a divergent BB:
        identifying, in the IR, a fourth BB that (i) is convergent, and (ii) strictly dominates the first BB, but does not strictly dominate any other BB that strictly dominates the first BB; and
        inserting a dummy definition statement for the respective variable of the virtual scalar register into the fourth BB.

4. The method of claim 3 comprising, after extending the live range of the virtual scalar register, allocating a physical register based on the extended live range of the virtual scalar register.

5. The method of claim 4 further comprising, after allocating the physical register, removing the dummy use statement and the dummy definition statement.

6. The method of claim 2 comprising, after extending the live range of the virtual scalar register, allocating a physical register based on the extended live range of the virtual scalar register.

7. The method of claim 6 further comprising, after allocating the physical register, removing the dummy use statement.

8. The method of claim 7 comprising, after allocating the physical register, serializing the plurality of BB's in a linearized order.

9. The method of claim 7 comprising generating a machine executable binary code representation of the IR after removing the dummy use statement.

10. The method of claim 9 wherein the machine executable binary code is configured to be executed by a processing unit that implements single-instruction-multiple-thread (SIMT) processing.

11. A system comprising:
    a memory storing instructions; and
    at least one processor in communication with the memory, the at least one processor configured, upon execution of the instructions, to perform the following steps:
        receive an intermediate representation (IR) of a source code configured to be executed by a processing device that implements single-instruction-multiple-thread (SIMT) processing, the IR representing the source code as a control flow graph including a plurality of basic blocks (BBs);
        identify, in the IR, a virtual scalar register for a respective variable, the virtual scalar register is defined in a first BB of the IR and last used in a second BB of the IR, the virtual scalar register holding a uniform value for the respective variable across a plurality of threads of a single work group, and the virtual scalar register having a live range corresponding to a span of BBs in the IR from the definition of the respective variable to the last use of the respective variable; and when the second BB of the IR is a divergent BB, modify the IR to extend the live range of the virtual scalar register.

12. The system of claim 11 wherein the processing device is configured to modify the IR to extend the live range of the virtual scalar register by:

identifying, in the IR, a third BB that (i) is convergent, and (ii) strictly post-dominates the second BB, but does not strictly post-dominate any other BB that strictly post-dominates the second BB; and inserting a dummy use statement for the respective variable of the virtual scalar register into the third BB.

13. The system of claim 12 wherein the processing device is configured to modify the IR to further extend the live range of the virtual scalar register when the first BB is a divergent BB by:

identifying, in the IR, a fourth BB that (i) is convergent, and (ii) strictly dominates the first BB, but does not strictly dominate any other BB that strictly dominates the first BB; and inserting a dummy definition statement for the respective variable of the virtual scalar register into the fourth BB.

14. The system of claim 13 wherein the processing device is configured to, after extending the live range of the virtual scalar register, allocate a physical register based on the extended live range of the virtual scalar register.

15. The system of claim 14 wherein the processing device is configured to, after allocating the physical register, remove the dummy use statement and the dummy definition statement.

16. The system of claim 12 wherein the processing device is configured to, after extending the live range of the virtual scalar register, allocate a physical register based on the extended live range of the virtual scalar register.

17. The system of claim 16 wherein the processing device is configured to, after allocating the physical register, remove the dummy use statement and the dummy definition statement.

18. The system of claim 17, wherein the processing device is configured to generate a machine executable binary code representation of the IR after removing the dummy use statement.

19. The system of claim 18, wherein the machine executable binary code is configured to be run by a processing unit that implements single-instruction-multiple-thread (SIMT) processing.

20. A non-transitory computer-readable storage medium storing computer instructions that configure at least one processor, upon execution of the instructions, to perform the following steps:

receive an intermediate representation (IR) of a source code configured to be executed by a processing unit that implements single-instruction-multiple-thread (SIMT) processing, the IR representing the source code as a control flow graph including a plurality of basic blocks (BBs);

identify, in the IR, a virtual scalar register for a respective variable, the virtual scalar register is defined in a first BB of the IR and last used in a second BB of the IR, the virtual scalar register holding a uniform value for the respective variable across a plurality of threads of a single work group, and the virtual scalar resister having a live range corresponding to a span of BBs in the IR from the definition of the respective variable to the last use of the respective variable; and when the second BB of the IR is a divergent BB, modify the IR to extend the live range of the virtual scalar register.

* * * * *

UNITED STATES PATENT AND TRADEMARK OFFICE
CERTIFICATE OF CORRECTION

| | |
|---|---|
| PATENT NO. | : 11,556,319 B2 |
| APPLICATION NO. | : 17/009441 |
| DATED | : January 17, 2023 |
| INVENTOR(S) | : Chan et al. |

It is certified that error appears in the above-identified patent and that said Letters Patent is hereby corrected as shown below:

In the Claims

In Column 12, Line 3 "threads of a single work croup, and the virtual scalar" should read -- threads of a single work group, and the virtual scalar --.

In Column 14, Line 30 "a single work group, and the virtual scalar resister" should read -- a single work group, and the virtual scalar register --.

Signed and Sealed this
Eighteenth Day of April, 2023

Katherine Kelly Vidal
*Director of the United States Patent and Trademark Office*